US012025943B2

(12) United States Patent
Shingu et al.

(10) Patent No.: US 12,025,943 B2
(45) Date of Patent: Jul. 2, 2024

(54) CLEANING BLADE, CLEANING DEVICE, PROCESS CARTRIDGE, AND IMAGE FORMING APPARATUS

(71) Applicant: FUJIFILM Business Innovation Corp., Tokyo (JP)

(72) Inventors: Kenta Shingu, Kanagawa (JP); Daisuke Tano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/156,406

(22) Filed: Jan. 19, 2023

(65) Prior Publication Data

US 2024/0036506 A1 Feb. 1, 2024

(30) Foreign Application Priority Data

Jul. 27, 2022 (JP) ................................ 2022-119451

(51) Int. Cl.
*G03G 21/00* (2006.01)
*G03G 21/18* (2006.01)

(52) U.S. Cl.
CPC ....... *G03G 21/0017* (2013.01); *G03G 21/007* (2013.01); *G03G 21/1814* (2013.01)

(58) Field of Classification Search
CPC ............ G03G 15/0225; G03G 15/161; G03G 15/168; G03G 15/2025; G03G 21/007; G03G 21/0011; G03G 21/0017; G03G 2221/0005; G03G 2221/0026; G03G 2221/0068; G03G 2221/0089
See application file for complete search history.

(56) References Cited

U.S. PATENT DOCUMENTS 6,408,145 B1 * 6/2002 Ohki ...................... G03G 15/01 399/176
8,315,535 B2 11/2012 Shintani et al.
2009/0220286 A1 * 9/2009 Kurihara ............ G03G 21/0011 399/264
2014/0086656 A1 * 3/2014 Takahashi .......... G03G 21/0011 399/350
2019/0011871 A1 * 1/2019 Kimura .............. G03G 21/0017

FOREIGN PATENT DOCUMENTS

JP 2010169899 8/2010

* cited by examiner

*Primary Examiner* — Thomas S Giampaolo, II
(74) *Attorney, Agent, or Firm* — JCIPRNET

(57) ABSTRACT

A cleaning blade in which a Young's modulus of a contact portion that comes into contact with a member to be cleaned is 14 MPa or more and 25 MPa or less, and a tip angle of the contact portion is 55 degrees or more and 80 degrees or less.

14 Claims, 3 Drawing Sheets

CLEANING BLADE, CLEANING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-119451 filed Jul. 27, 2022.

BACKGROUND

(i) Technical Field

The present disclosure relates to a cleaning blade, a cleaning device, a process cartridge, and an image forming apparatus.

(ii) Related Art

JP2010-169899A discloses a cleaning device including: a lubricant applying portion that applies a lubricant to a rotatable image carrier carrying a toner image; a rubber blade for cleaning that is provided on the upstream side in a rotation direction of the image carrier from a position of the lubricant applying portion, and has a tip portion that is brought into contact with the image carrier to remove a transfer residual toner remaining on the image carrier; a rubber blade for leveling that is provided on the downstream side in the rotation direction of the image carrier from the position of the lubricant applying portion, and has a tip portion that is brought into contact with the image carrier to level the lubricant; a temperature measuring portion that measures a temperature of the rubber blade for leveling or a temperature near the rubber blade for leveling; a heating portion that heats the rubber blade for leveling; and a temperature control portion that performs heating by controlling the heating portion so that in a case where a temperature measured by the temperature measuring portion is lower than a set temperature previously set, the measured temperature reaches the set temperature.

SUMMARY

Aspects of non-limiting embodiments of the present disclosure relate to a cleaning blade with which an image, in which the occurrence of color streaks by cleaning defects is suppressed, can be formed even in a case where the cleaning blade is applied to a cleaning device that cleans a surface of an image holder without using a lubricant, compared to a case where a Young's modulus of a contact portion is less than 14 MPa or more than 25 MPa, a tip angle of the contact portion is less than 55 degrees or more than 80 degrees, or an area ratio of aggregates of a hard segment is less than 18% or more than 28%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for addressing the above-described object includes the following aspect.

According to an aspect of the present disclosure, there is provided a cleaning blade in which a Young's modulus of a contact portion that comes into contact with a member to be cleaned is 14 MPa or more and 25 MPa or less, and a tip angle of the contact portion is 55 degrees or more and 80 degrees or less.

BRIEF DESCRIPTION OF THE DRAWINGS

Exemplary embodiment(s) of the present invention will be described in detail based on the following figures, wherein.

DETAILED DESCRIPTION

Figure 1:
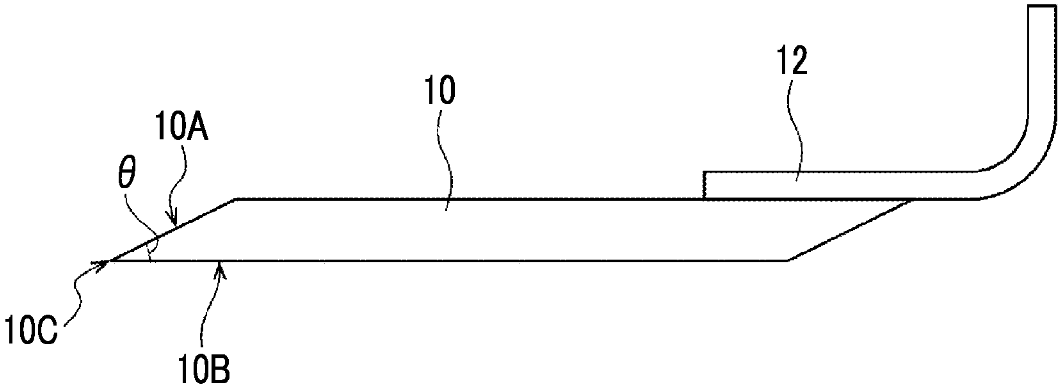
FIG. 1 is a schematic cross-sectional view showing an example of a cleaning blade according to the present exemplary embodiment.

Hereinafter, exemplary embodiments that are examples of the present disclosure will be described. The following descriptions and examples merely illustrate exemplary embodiments, and do not limit the scope of the exemplary embodiments.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

Cleaning Blade

First Exemplary Embodiment

In a cleaning blade according to a first exemplary embodiment, a Young's modulus of a contact portion that comes into contact with a member to be cleaned is 14 MPa or more and 25 MPa or less, and a tip angle of the contact portion is 55 degrees or more and 80 degrees or less.

Here, the tip angle of the contact portion of the cleaning blade means an angle between two surfaces configuring the contact portion of the cleaning blade.

FIG. 1 shows a schematic cross-sectional view of an example of a cleaning blade according to the present exemplary embodiment. One end portion of a cleaning blade 10 shown in FIG. 1 is a contact portion 10C that comes into contact with a member to be cleaned, and the other end portion is held by a holding member 12. Examples of the holding member 12 include a rigid plate-like support, and more specifically, examples of the holding member include a metal plate.

In the cleaning blade 10, the contact portion 10C comes into contact with the member to be cleaned, and the member to be cleaned is thus cleaned.

The contact portion 10C is configured with an intersection line between a tip surface 10A and a side surface 10B of the cleaning blade 10, and an angle θ formed by the tip surface 10A and the side surface 10B is defined as the "tip angle of the contact portion". FIG. 1 is a cross-sectional view perpendicular to the intersection of the tip surface 10A and the side surface 10B.

In a cross-section cut at the contact portion of the cleaning blade, that is, a surface perpendicular to the intersection of two surfaces configuring the contact portion of the cleaning blade, the angle between the two surfaces is measured by a laser microscope as the tip angle of the contact portion.

In addition, the Young's modulus of the contact portion is measured using a nanoindentation method. Specifically, by using PICODENTOR HM500 manufactured by Fischer Instrumentation and a Berkovich diamond indenter, an indentation depth-loading curve is drawn. Then, an unloading curve is drawn by applying load so that the maximum indentation depth reaches 1,000 nm and then removing the load, and the slope of the unloading curve is calculated as the Young's modulus.

In the first exemplary embodiment, the Young's modulus of the contact portion of the cleaning blade is within the above range and the tip angle is within the above range, so that even in a case where a surface of an image holder is cleaned without using a lubricant, an image in which the occurrence of color streaks by cleaning defects is suppressed is formed. The reason is not clear, but the reason is presumed as follows.

In recent years, it has been required to clean a member to be cleaned by a cleaning blade with no application of lubricant. In a case where a member to be cleaned is cleaned by a cleaning blade with no application of lubricant, the frictional force applied to the cleaning blade is higher than in a case where the lubricant is applied. In particular, in a case where the member to be cleaned is charged by applying an AC voltage, discharge products generated by the discharge load adhere to the surface of the member to be cleaned, and thus the frictional force applied to the cleaning blade cleaning the member to be cleaned is likely to be further increased.

In a case where by using a cleaning blade of the related art appropriate for cleaning with a low frictional force, a member to be cleaned is cleaned with no application of lubricant, a contact portion of the cleaning blade vibrates due to the high frictional force. As a result, the cleaning target may slip through the cleaning blade. Specifically, the vibration of the contact portion temporarily generates a gap between the cleaning blade and the member to be cleaned, and thus the cleaning target slips through the generated gap. In addition, in a case where the cleaning target is toner particles, the toner particles may slip through the gap and make color streaks in an image. Therefore, there is a demand for a cleaning blade in which cleaning defects are suppressed even in a state where a high frictional force is applied.

Regarding this, in the cleaning blade according to the first exemplary embodiment, the Young's modulus of the contact portion is higher than the Young's modulus of a cleaning blade of the related art. Thus, it is thought that the vibration of the contact portion is suppressed, and a cleaning target is less likely to slip through the cleaning blade even in a case where a high frictional force is applied.

In addition, in a case where the Young's modulus of the contact portion is within the above range, but the tip angle is smaller than the above range, the contact portion is likely to be worn in a case where a high frictional force is applied to the contact portion. Thus, the contact portion may be chipped due to the impact of collision with a member to be cleaned or a cleaning target. In a case where the contact portion is chipped, the cleaning target easily slips through the gap generated by the chipping.

In contrast, in a case where the Young's modulus of the contact portion is within the above range, but the tip angle is larger than the above range, the contact portion is likely to be in a state called belly-abutting from a state called tack where the contact portion is caught and turned over to the downstream side in a moving direction of a member to be cleaned in a case where a high frictional force is applied to the contact portion. In a case where the contact portion is belly-abutted against the member to be cleaned, surface contact is made and the surface pressure is thus lowered. Therefore, the cleaning target is likely to slip through the cleaning blade.

Furthermore, in a case where the Young's modulus of the contact portion is higher than the above range, chipping of the contact portion or belly-abutting against the member to be cleaned is likely to occur even in a case where the tip angle of the contact portion is within the above range.

Regarding this, in the cleaning blade according to the first exemplary embodiment, the Young's modulus of the contact portion is within the above range, and the tip angle of the contact portion is within the above range. Therefore, it is presumed that both cleaning defects caused by chipping of the contact portion and cleaning defects caused by belly-abutting of the contact portion are suppressed.

Due to the above reason, in the first exemplary embodiment, it is presumed that an image in which the occurrence of color streaks by cleaning defects is suppressed is formed even in a case where a surface of an image holder is cleaned without using a lubricant.

In the first exemplary embodiment, the tip angle of the contact portion of the cleaning blade is 55 degrees or more and 80 degrees or less, and from the viewpoint of suppressing cleaning defects, the tip angle is, for example, preferably 65 degrees or more and 75 degrees or less, and more preferably 68 degrees or more and 73 degrees or less.

In addition, the Young's modulus of the contact portion of the cleaning blade is 14 MPa or more and 25 MPa or less, and from the viewpoint of suppressing cleaning defects, the Young's modulus is, for example, preferably 18 MPa or more and 24 MPa or less, and more preferably 19 MPa or more and 22 MPa or less.

The method of adjusting the Young's modulus of the contact portion of the cleaning blade within the above range is not particularly limited, and examples thereof include a method in which the contact portion is configured with a polyurethane rubber member having a hard segment and a soft segment, in which an area ratio of aggregates of the hard segment is 18% or more and 28% or less, as will be described later.

Hereinafter, the polyurethane rubber member having a hard segment and a soft segment, in which an area ratio of aggregates of the hard segment is 18% or more and 28% or less, is also referred to as "specific polyurethane rubber member".

However, in the first exemplary embodiment, each of the Young's modulus and the tip angle of the contact portion may be within the above range, and the present exemplary embodiment is not limited to the cleaning blade having a contact portion configured with a specific polyurethane rubber member. The contact portion of the cleaning blade may be configured with a polyurethane rubber member other than the specific polyurethane rubber member. Moreover, the contact portion may be configured with a member including a different rubber elastic body as a major component, such as a polyimide rubber member, a silicone rubber member, a fluororubber member, a propylene rubber member, and a butadiene rubber member. Here, the major component refers to a component that occupies 50% by mass or more of the whole member.

In addition, the cleaning blade 10 shown in FIG. 1 has a single layer configuration and consists of a single material. However, in the first exemplary embodiment, the cleaning blade is not limited thereto in a case where each of the Young's modulus and the tip angle of the contact portion is within the above range. In the first exemplary embodiment, the cleaning blade may have a single layer configuration, or a multi-layer configuration in which a layer configuring the contact portion and a layer made of a material different from the contact portion are combined.

Second Exemplary Embodiment

In a cleaning blade according to a second exemplary embodiment, a contact portion that comes into contact with a member to be cleaned is configured with a polyurethane rubber member having a hard segment and a soft segment, and in an image that is an AFM phase image obtained by observing a surface of the contact portion with an atomic force microscope, an area ratio of aggregates of the hard segment is 18% or more and 28% or less with respect to the whole image, and a tip angle of the contact portion is 55 degrees or more and 80 degrees or less.

That is, in the cleaning blade according to the second exemplary embodiment, the contact portion is configured with a specific polyurethane rubber member.

Hereinafter, the area ratio of aggregates of the hard segment in an image that is an AFM phase image obtained by observing the surface with an atomic force microscope is also simply referred to as "area ratio of aggregates".

The Details and measurement method of the tip angle of the contact portion are as described above.

The method of measuring the area ratio of aggregates in the contact portion is as follows. An image that is an AFM phase image is obtained by measurement using an atomic force microscope (AFM) (AFM100, manufactured by Hitachi High-Tech Corporation) at an angle of view of 50 μm square. Then, the image is binarized by image processing by Otsu's binarization. A region containing a high-frequency component is defined as a hard segment, and an area ratio of aggregates (%) is calculated by dividing the area of the region by the area of the whole observation region.

In the second exemplary embodiment, the area ratio of aggregates in the contact portion of the cleaning blade is within the above range and the tip angle is within the above range, so that even in a case where a surface of an image holder is cleaned without using a lubricant, an image in which the occurrence of color streaks by cleaning defects is suppressed is formed. The reason is not clear, but the reason is presumed as follows.

As described above, in a case where a member to be cleaned is cleaned by a cleaning blade with no application of lubricant, the frictional force applied to the cleaning blade increases, and in a case where a cleaning blade of the related art is used, the cleaning target is likely to slip through the cleaning blade due to the vibration of the contact portion. Therefore, there is a demand for a cleaning blade in which cleaning defects are suppressed even in a state where a high frictional force is applied.

Meanwhile, in the cleaning blade according to the second exemplary embodiment, the area ratio of aggregates in the contact portion is within the above range, and thus the contact portion is harder than in a case where the area ratio is lower than the above range. Therefore, it is thought that the vibration of the contact portion is suppressed, and the cleaning target is less likely to slip through the cleaning blade even in a case where a high frictional force is applied.

In addition, even in a case where the area ratio of aggregates in the contact portion is within the above range, in a case where the tip angle is smaller than the above range, the contact portion is likely to be chipped, and in a case where the tip angle is larger than the above range, belly-abutting against the member to be cleaned is likely to occur.

Furthermore, in a case where the area ratio of aggregates in the contact portion is higher than the above range, chipping of the contact portion or belly-abutting against the member to be cleaned is likely to occur even in a case where the tip angle of the contact portion is within the above range.

Regarding this, in the cleaning blade according to the second exemplary embodiment, the area ratio of aggregates in the contact portion is within the above range, and the tip angle of the contact portion is within the above range. Therefore, it is presumed that both cleaning defects caused by chipping of the contact portion and cleaning defects caused by belly-abutting of the contact portion are suppressed.

Due to the above reason, in the second exemplary embodiment, it is presumed that an image in which the occurrence of color streaks by cleaning defects is suppressed is formed even in a case where a surface of an image holder is cleaned without using a lubricant.

In the second exemplary embodiment, the tip angle of the contact portion of the cleaning blade is 55 degrees or more and 80 degrees or less, and from the viewpoint of suppressing cleaning defects, the tip angle is, for example, preferably 65 degrees or more and 75 degrees or less, and more preferably 68 degrees or more and 73 degrees or less.

In addition, the area ratio of aggregates in the contact portion of the cleaning blade is 18% or more and 28% or less, and from the viewpoint of suppressing cleaning defects, the area ratio is, for example, preferably 20% or more and 25% or less, and more preferably 21% or more and 24% or less.

The method of adjusting the area ratio of aggregates in the contact portion of the cleaning blade within the above range is not particularly limited, and examples thereof include a method in which the kind and the amount of a monomer to be used for manufacturing a polyurethane rubber member are adjusted, and a method in which an impregnated and cured layer of an isocyanate compound is formed as a surface layer of the contact portion.

In the second exemplary embodiment, the cleaning blade may have a single layer configuration, or a multi-layer configuration in which a layer configuring the contact portion and a layer made of a material different from the contact portion are combined.

Hereinafter, an embodiment corresponding to both the first exemplary embodiment and the second exemplary embodiment will be referred to as the present exemplary embodiment. However, an example of the cleaning blade of the present disclosure may be a cleaning blade corresponding to at least one of the cleaning blade according to the first exemplary embodiment or the cleaning blade according to the second exemplary embodiment.

Hereinafter, as an example of the cleaning blade according to the present exemplary embodiment, a cleaning blade having a single layer configuration configured with a specific polyurethane rubber member will be described.

Specific Polyurethane Rubber Member

The specific polyurethane rubber member is a member including polyurethane rubber as a major component. The content of the polyurethane rubber with respect to the whole specific polyurethane rubber member is, for example, preferably 80% by mass or more, more preferably 90% by mass or more, and even more preferably 95% by mass or more.

The polyurethane rubber is obtained by polymerizing at least a polyol component and a polyisocyanate component. As necessary, the polyurethane rubber may be obtained by polymerizing a resin having a functional group capable of reacting with an isocyanate group of a polyisocyanate, in addition to the polyol component.

The polyurethane rubber included in the specific polyurethane rubber member has a hard segment and a soft segment. In the polyurethane rubber material, “hard segment” means a segment that consists of a material relatively harder than a material configuring “soft segment”, and “soft segment” means a segment that consists of a material relatively softer than the material configuring “hard segment”.

Examples of the material configuring the hard segment (hard segment material) include a low-molecular-weight polyol component among polyol components, and a resin having a functional group capable of reacting with an isocyanate group of a polyisocyanate. On the other hand, examples of the material configuring the soft segment (soft segment material) include a high-molecular-weight polyol component among polyol components.

Polyol Component

The polyol component includes a high-molecular-weight polyol and a low-molecular-weight polyol.

The high-molecular-weight polyol component is a polyol having a number-average molecular weight of 500 or more (for example, preferably 500 or more and 5,000 or less). Examples of the high-molecular-weight polyol component include known polyols such as a polyester polyol obtained by dehydrocondensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of the high-molecular-weight polyol include PLACCEL 205 and PLACCEL 240 manufactured by Daicel Corporation.

The number-average molecular weight is a value measured by gel permeation chromatography (GPC). The same shall apply hereinafter.

Each of the high-molecular-weight polyols may be used alone, or two or more kinds of the high-molecular-weight polyols may be used in combination.

The polymerization ratio of the high-molecular-weight polyol component to all the polymerization components of the polyurethane rubber may be, for example, 30 mol % or more and 50 mol % or less, and is preferably 40 mol % or more and 50 mol % or less.

The low-molecular-weight polyol component is a polyol having a molecular weight (number-average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, for example, 1,4-butanediol is preferably used as the low-molecular-weight polyol component.

Examples of the low-molecular-weight polyol component also include a diol (difunctional), a triol (trifunctional), and a tetraol (tetrafunctional) that are well known as chain extenders and crosslinking agents.

Each of the polyols may be used alone, or two or more kinds of the polyols may be used in combination.

The polymerization ratio of the low-molecular-weight polyol component to all the polymerization components of the polyurethane rubber may be, for example, more than 50 mol % and 75 mol % or less, preferably 52 mol % or more and 75 mol % or less, more preferably 55 mol % or more and 75 mol % or less, and even more preferably 55 mol % or more and 60 mol % or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4'-diisocyanate (TODI).

As the polyisocyanate component, for example, 4,4'-diphenylmethane diisocyanate (MDI), 1,5-naphthalene diisocyanate (NDI), and hexamethylene diisocyanate (HDI) are more preferable.

Each of the polyisocyanate components may be used alone, or two or more kinds of the polyisocyanate components may be used in combination.

The polymerization ratio of the polyisocyanate component to all the polymerization components of the polyurethane rubber may be, for example, 5 mol % or more and 25 mol % or less, and preferably 10 mol % or more and 20 mol % or less.

Resin Having Functional Group Capable of Reacting with Isocyanate Group

As the resin having a functional group capable of reacting with an isocyanate group (hereinafter, called “functional group-containing resin”), for example, a flexible resin is preferable, and an aliphatic resin having a linear structure is more preferable in view of flexibility. Specific examples of the functional group-containing resin include an acrylic resin containing two or more hydroxyl groups, a polybutadiene resin containing two or more hydroxyl groups, and an epoxy resin having two or more epoxy groups.

Examples of commercially available products of the acrylic resin containing two or more hydroxyl groups include ACTFLOW manufactured by Soken Chemical & Engineering Co., Ltd. (grades: UMB-2005B, UMB-2005P, UMB-2005, UME-2005, and the like).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is preferable that is not hard and brittle just as general epoxy resins of the related art and is more flexible and tougher than the epoxy resins of the related art. As such an epoxy resin, for example, in view of molecular structure, an epoxy resin is preferable that has a structure (flexible skeleton) capable of improving mobility of a main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In view of physical properties, for example, an epoxy resin is preferable that has a lower viscosity for the molecular weight compared to the epoxy resins of the related art. Specifically, for example, an epoxy resin is preferable that has a weight-average molecular weight in a range of 900±100 and a viscosity at 25° C. in a range of 15,000±5,000 mPa s, and an epoxy resin is more preferable that has a viscosity at 25° C. in a range of 15,000±3,000 mPa s. Examples of commercially available products of the epoxy resin having such characteristics include EPICLON EXA-4850-150 manufactured by DIC Corporation.

The polymerization ratio of the functional group-containing resin may be, for example, within a range not impairing the characteristics of the cleaning blade.

Manufacturing Method of Polyurethane Rubber

For manufacturing the polyurethane rubber, a general polyurethane manufacturing method, such as a prepolymer method or a one-shot method, is used. With the prepolymer method, polyurethane extremely resistant to wear and chipping is obtained. Therefore, this method is suited for the present exemplary embodiment, but the present exemplary embodiment is not limited by the manufacturing method.

The cleaning blade is prepared by forming a composition for forming a cleaning blade prepared by the above method into a sheet by using, for example, centrifugal molding, extrusion molding, or the like and processing the sheet by cutting or the like.

Here, examples of the catalyst used for manufacturing the polyurethane rubber include an amine-based compound such as a tertiary amine, a quaternary ammonium salt, and an organometallic compound such as an organotin compound.

Examples of the tertiary amine include a trialkylamine such as triethylamine, a tetraalkyldiamine such as N,N,N',N'-tetramethyl-1,3-butanediamine, an amino alcohol such as dimethylethanolamine, an ester amine such as an ethoxylated amine, an ethoxylated diamine, and bis(diethylethanolamine)adipate, triethylenediamine (TEDA), a cyclohexylamine derivative such as N,N-dimethylcyclohexylamine, a morpholine derivative such as N-methylmorpholine and N-(2-hydroxypropyl)-dimethylmorpholine, and a piperazine derivative such as N,N'-diethyl-2-methylpiperazine and N,N'-bis-(2-hydroxypropyl)-2-methylpiperazine.

Examples of the quaternary ammonium salt include 2-hydroxypropyltrimethylammonium·octylate, 1,5-diazabicyclo[4.3.0]nonene-5 (DBN) octylate, 1,8-diazabicyclo[5.4.0]undecene-7 (DBU)-octylate, DBU-oleate, DBU-p-toluenesulfonate, DBU-formate, and 2-hydroxypropyltrimethylammonium formate.

Examples of the organotin compound include a dialkyltin compound such as dibutyltin dilaurate and dibutyltin di(2-ethylhexanoate), stannous 2-ethylcaproate, and stannous oleate.

Among these catalysts, in view of hydrolysis resistance, triethylenediamine (TEDA), which is a tertiary ammonium salt, is used. Furthermore, in view of processability, for example, a quaternary ammonium salt is used. Among the quaternary ammonium salts, for example, 1,5-diazabicyclo[4.3.0]nonene-5 (DBN) octylate, 1,8-diazabicyclo[5.4.0]undecene-7 (DBU)-octylate, and DBU-formate, that are highly reactive, are used.

The content of the catalysts with respect to the total mass of the polyurethane rubber configuring the contact member is, for example, preferably in a range of 0.0005% by mass or more and 0.03% by mass or less, and particularly preferably 0.001% by mass or more and 0.01% by mass or less.

Each of the catalysts may be used alone, or two or more kinds of the catalysts may be used in combination.

Modification of Contact Portion

It is preferable that the specific polyurethane rubber member configuring the contact portion has, as a surface layer, for example, an impregnated and cured layer of an isocyanate compound.

By providing the impregnated and cured layer, the hardness of the contact portion is increased, and the Young's modulus of the contact portion is easily adjusted within the above range.

Here, the surface layer of the polyurethane rubber member configuring the contact portion means a region up to 200 μm upward from the surface of the contact portion.

The impregnated and cured layer is a layer obtained by impregnating the surface layer of an elastic layer with a surface treatment liquid containing an isocyanate compound and an organic solvent, and curing the surface treatment liquid (that is, the isocyanate compound).

The impregnated and cured layer is formed as a layer integrated with the surface layer of the contact portion so that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modification products of these.

The surface layer of the specific polyurethane rubber member configuring the contact portion may have a layer impregnated with diamond-like carbon. A diamond-like carbon layer may be provided on the surface of the specific polyurethane rubber member configuring the contact portion.

Member to be Cleaned

The member to be cleaned that is a target of cleaning by the cleaning blade according to the present exemplary embodiment is not particularly limited as long as the member is required to be subjected to surface cleaning. For example, in a case where the member to be cleaned is used in an image forming apparatus, examples of the member to be cleaned include an image holder (for example, an electrophotographic photoreceptor), an intermediate transfer body, a charging roll, a transfer roll, a transfer material transport belt, and a paper transport roll. Examples of the member to be cleaned also include a detoning roll that further removes a toner from a cleaning brush removing the toner from the image holder. In the present exemplary embodiment, for example, it is particularly preferable that the member to be cleaned is an image holder.

Hereinafter, a form in which the member to be cleaned is an image holder will be described as an example of the present exemplary embodiment.

Cleaning Device, Process Cartridge, and Image Forming Apparatus

Next, a cleaning device using the cleaning blade according to the present exemplary embodiment, a process cartridge, and an image forming apparatus will be described.

The cleaning device according to the present exemplary embodiment is not particularly limited as long as the cleaning device includes the cleaning blade according to the present exemplary embodiment as a cleaning blade that comes into contact with a surface of a member to be cleaned and cleans the surface of the member to be cleaned. Examples of the configuration of the cleaning device include a configuration in which inside a cleaning case having an opening portion on the side of a member to be cleaned, a cleaning blade is fixed so that an edge tip (that is, a contact surface) is on the opening portion side, and a transport member that guides, to a removed material recovery container, a removed material such as a waste toner recovered by the cleaning blade from a surface of the member to be cleaned is provided. In addition, two or more cleaning blades according to the present exemplary embodiment may be used in the cleaning device according to the present exemplary embodiment.

Meanwhile, the process cartridge according to the present exemplary embodiment is not particularly limited as long as the process cartridge includes the cleaning device according to the present exemplary embodiment as a cleaning device that comes into contact with a surface of an image holder as a member to be cleaned and cleans the surface of the image holder.

Examples of the process cartridge according to the present exemplary embodiment include a process cartridge having an aspect in which an image holder and the cleaning device according to the present exemplary embodiment that cleans a surface of the image holder by bringing the above-described cleaning blade into contact with the surface of the image holder are provided, and the process cartridge is detachably attached to an image forming apparatus. For example, in a so-called tandem machine having image holders corresponding to toners of respective colors, the cleaning device according to the present exemplary embodiment may be provided for each image holder. In addition, a cleaning brush or the like may be used in combination with the cleaning device according to the present exemplary embodiment.

The process cartridge according to the present exemplary embodiment may further include, or may not include a lubricant applying device that applies a lubricant to a surface of an image holder as a member to be cleaned. In the present exemplary embodiment, since the surface of the image holder is cleaned by using the above-described cleaning blade, cleaning defects are less likely to occur even in a case where the surface of the image holder is cleaned with no application of lubricant. Since the process cartridge does not include the lubricant applying device, the cost is suppressed, and the number of items to be controlled, such as coating uniformity of the lubricant, is reduced.

The process cartridge according to the present exemplary embodiment may further include a charging device that charges a surface of an image holder by applying an AC voltage. In the present exemplary embodiment, since the surface of the image holder is cleaned by using the above-described cleaning blade, cleaning defects are less likely to occur even in a case where discharge products generated by the discharge load of the AC voltage adheres to the surface of the image holder and the frictional force applied to the cleaning blade increases. Since the process cartridge includes a charging device that charges a surface of an image holder by applying an AC voltage, the charging uniformity is improved compared to a case where only a DC voltage is applied, and thus high image quality can be realized.

As the charging device, for example, a contact type charger formed of a conductive or semiconductive charging roll, a charging brush, a charging film, a charging rubber blade, a charging tube, or the like is used. Further, known chargers such as a non-contact type roll charger, a scorotron charger using corona discharge, and a corotron charger are also used. Here, the conductive property means that the volume resistivity at 20° C. is less than 1×10 Ωcm, and the semiconductive property means that the volume resistivity at 20° C. is 1×10 Ωcm or more and $1\times10^{10}$ Ωcm or less. In addition, the volume resistivity is a value measured by a volume resistance meter MODEL 152-1 manufactured by TREK.

In a case where the process cartridge according to the present exemplary embodiment includes a charging device that charges a surface of an image holder by applying an AC voltage, an effective value of the applied AC voltage is, for example, in a range of 1,000 V or more and 4,000 V or less, and may be 1,200 V or more and 3,000 V or less, or 1,500 V or more and 2,000 V or less.

In the present exemplary embodiment, since the surface of the image holder is cleaned by using the above-described cleaning blade, cleaning defects are less likely to occur even in a case where the effective value of the applied AC voltage is within the above range.

The frequency of the AC voltage is, for example, 50 Hz or more and 20,000 Hz or less, and may be 100 Hz or more and 5,000 Hz or less.

The charging device that charges a surface of an image holder by applying an AC voltage may be a charging device that applies a voltage generated by superimposing an AC voltage on a DC voltage.

In the image holder as a member to be cleaned in the process cartridge according to the present exemplary embodiment, a coefficient of dynamic friction of the surface against a sapphire needle may be 0.7 or more.

Hereinafter, the coefficient of dynamic friction against a sapphire needle is also referred to as "coefficient of needle friction".

In the present exemplary embodiment, since the surface of the image holder is cleaned by using the above-described cleaning blade, cleaning defects are less likely to occur even in a case where the coefficient of needle friction of the surface of the image holder is 0.7 or more.

The coefficient of needle friction of the surface of the image holder may be 0.7 or more, 0.8 or more, or 1.0 or more. From the viewpoint of suppressing cleaning defects, the coefficient of needle friction of the surface of the image holder is, for example, preferably 1.2 or less, more preferably 1.0 or less, and even more preferably 0.9 or less. The coefficient of needle friction of the surface of the image holder may be 0.2 or more and 0.9 or less.

The coefficient of needle friction of the surface of the image holder is measured as follows.

The friction coefficient is measured 30 times continuously on the surface of the image holder by a HEIDON resistance measuring method under the following measurement conditions, and an average of measured values from 10-th to 20-th times is calculated. As the friction coefficient, a coefficient of dynamic friction of a needle is measured. For the measurement of the friction coefficient, TRIBOGEAR (overload fluctuation type friction wear test system) and TYPEHHS2000 (using standard analysis software) manufactured by SHINTO Scientific Co., Ltd. are used.

Measurement Condition

Needle material: Diamond, Needle tip shape: R=0.2 mm, Overload: 20 g, Needle contact angle: 90° (in a direction perpendicular to the surface of the image holder), Needle movement distance: Reciprocating at 10 mm one way, Number of reciprocating times: 30 times Examples of the image holder having a surface having a coefficient of needle friction of 0.7 or more include an electrophotographic photoreceptor having a conductive substrate and a photosensitive layer provided on the conductive substrate.

The photosensitive layer may be a laminated photosensitive layer in which a charge generation layer and a charge transporting layer are laminated, or may be a single-layer photosensitive layer.

An undercoat layer may be provided between the conductive substrate and the photosensitive layer. An interlayer may be further provided between the undercoat layer and the photosensitive layer.

Examples of the method of controlling the coefficient of needle friction of the surface of the image holder to 0.7 or more include a method of adhering discharge products by discharge on a charging roll.

In the process cartridge according to the present exemplary embodiment, a coefficient of dynamic friction between the surface of the image holder and the contact portion of the cleaning blade may be 0.9 or more and 1.2 or less.

Hereinafter, the coefficient of dynamic friction between the surface of the image holder and the contact portion of the cleaning blade is also referred to as "coefficient of relative friction".

In the present exemplary embodiment, since the surface of the image holder is cleaned by using the above-described cleaning blade, cleaning defects are less likely to occur even in a case where the coefficient of relative friction is 0.9 or more.

The coefficient of relative friction may be 1.0 or more, or 1.2 or more. From the viewpoint of suppressing cleaning defects, the coefficient of relative friction is, for example, preferably 1.2 or less, more preferably 1.1 or less, and even more preferably 0.9 or less. The coefficient of relative friction may be 0.2 or more and 0.9 or less.

Examples of the method of controlling the coefficient of relative friction to 0.9 or more include a method of adhering discharge products by discharge.

The coefficient of relative friction is measured as follows.

The cleaning blade is brought into contact with an outer peripheral surface of an image holder so that the cleaning blade is parallel to an axial direction of the image holder and forms an angle of 30 degrees with a tangential plane of the image holder. A load of 3.5 gf/mm (3.5 gf per 1 mm in the axial direction of the image holder) is applied to a contact portion between the image holder and the cleaning blade. The image holder is moved from the vicinity of one end to the vicinity of the other end of the image holder at a speed of 100 mm/s in a direction of entering under the cleaning blade. A moving direction of the image holder on a stand of a frictional force measuring device coincides with a rotation direction of the image holder in the image forming apparatus. The image holder is moved and the dynamic frictional force between the image holder and the cleaning blade is measured to obtain a coefficient of dynamic friction μ. The measurement is performed at a temperature of 22° C. and a relative humidity of 55%.

The image forming apparatus according to the present exemplary embodiment is not particularly limited as long as the image forming apparatus includes the cleaning device according to the present exemplary embodiment as a cleaning device that comes into contact with a surface of an image holder as a member to be cleaned and cleans the surface of the image holder.

Examples of the image forming apparatus according to the present exemplary embodiment include an image forming apparatus having an aspect in which an image holder, a charging device that charges the image holder, an electrostatic latent image forming device that forms an electrostatic latent image on a surface of the charged image holder, a developing device that develops the electrostatic latent image formed on the surface of the image holder with a toner to form a toner image, a transfer device that transfers the toner image formed on the image holder onto a recording medium, and the cleaning device according to the present exemplary embodiment that brings the above-described cleaning blade into contact with the surface of the image holder after transfer of the toner image by the transfer device to perform cleaning. For example, in a so-called tandem machine having image holders corresponding to toners of respective colors, the cleaning device according to the present exemplary embodiment may be provided for each image holder. In addition, a cleaning brush or the like may be used in combination with the cleaning device according to the present exemplary embodiment.

The image forming apparatus according to the present exemplary embodiment may further include, or may not include a lubricant applying device that applies a lubricant to a surface of an image holder as a member to be cleaned. In the present exemplary embodiment, since the surface of the image holder is cleaned by using the above-described cleaning blade, cleaning defects are less likely to occur even in a case where the surface of the image holder is cleaned with no application of lubricant. Since the image forming apparatus does not include the lubricant applying device, the cost is suppressed, and the number of items to be controlled, such as coating uniformity of the lubricant, is reduced.

The charging device in the image forming apparatus according to the present exemplary embodiment may be a charging device that charges a surface of an image holder by applying an AC voltage. In the present exemplary embodiment, since the surface of the image holder is cleaned by using the above-described cleaning blade, cleaning defects are less likely to occur even in a case where discharge products generated by the discharge load of the AC voltage adheres to the surface of the image holder and the frictional force applied to the cleaning blade increases. The details of the charging device and the details of the voltage applied by the charging device are as described above.

The coefficient of needle friction of the surface of the image holder as a member to be cleaned in the image forming apparatus according to the present exemplary embodiment may be 0.7 or more. In the present exemplary embodiment, since the surface of the image holder is cleaned by using the above-described cleaning blade, cleaning defects are less likely to occur even in a case where the coefficient of needle friction of the surface of the image holder is 0.7 or more. The details of the image holder are as described above.

In the image forming apparatus according to the present exemplary embodiment, the coefficient of relative friction that is a coefficient of dynamic friction between the surface of the image holder and the contact portion of the cleaning blade may be 0.9 or more and 1.2 or less. In the present exemplary embodiment, since the surface of the image holder is cleaned by using the above-described cleaning blade, cleaning defects are less likely to occur even in a case where the coefficient of relative friction is 0.9 or more. The details of the coefficient of relative friction are as described above.

Next, specific examples of the image forming apparatus and the cleaning device using the cleaning blade according to the present exemplary embodiment will be described in more detail with reference to the drawings.

Figure 2:
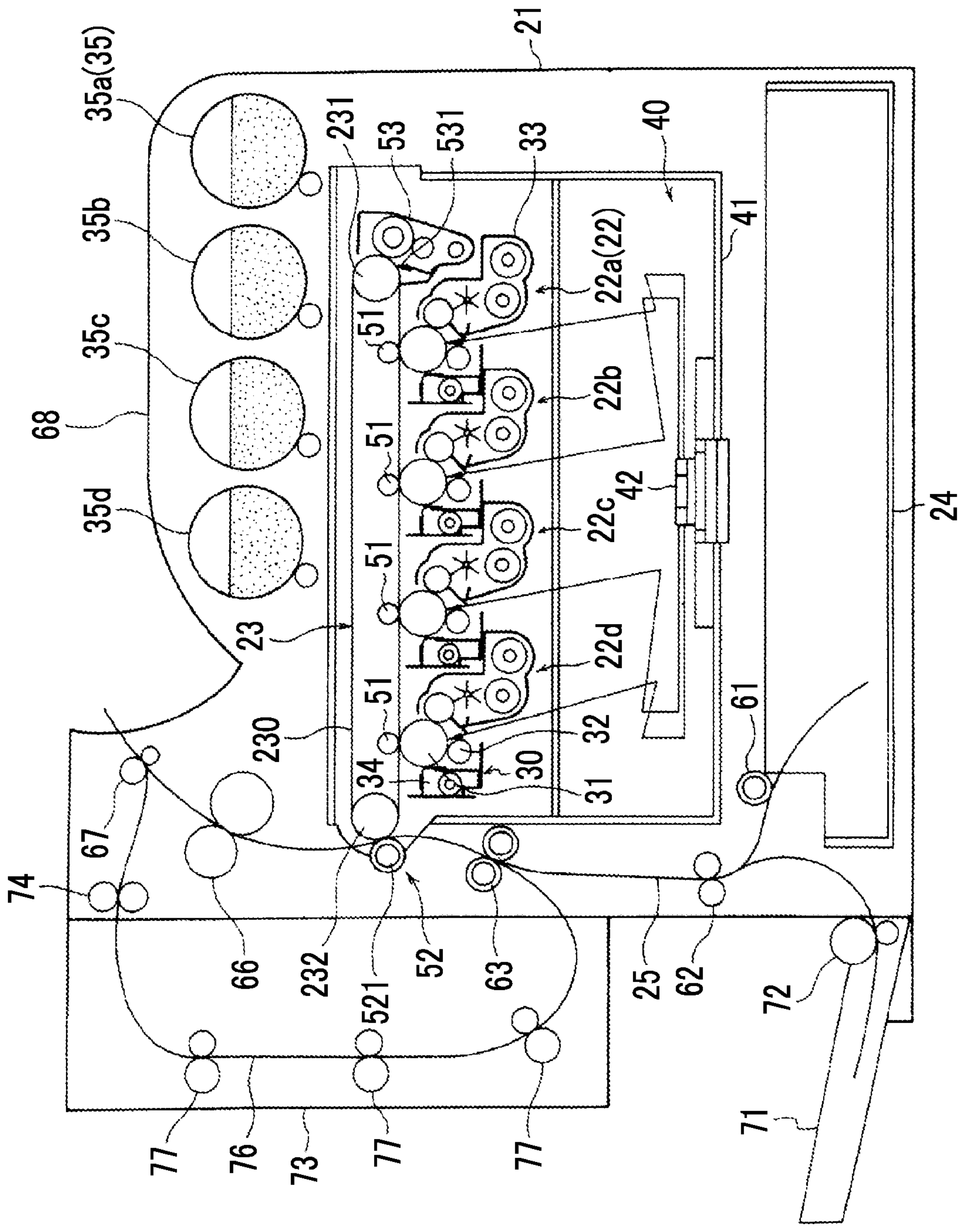
FIG. 2 is a schematic view showing an example of an image forming apparatus according to the present exemplary embodiment.

FIG. 2 is a schematic view showing an example of the image forming apparatus according to the present exemplary embodiment, and shows a so-called tandem type image forming apparatus.

In FIG. 2, the reference 21 represents a body housing, the references 22 and 22*a* to 22*d* represent an image forming unit, the reference 23 represents a belt module, the reference 24 represents a recording medium supply cassette, the reference 25 represents a recording medium transport path, the reference 30 represents each photoreceptor unit, the reference 31 represents a photoreceptor drum (an example of the image holder) as a member to be cleaned, the reference 33 represents each developing unit (an example of the developing device), the reference 34 represents a cleaning device, the references 35 and 35*a* to 35*d* represent a toner cartridge, the reference 40 represents an exposure unit (an example of the electrostatic latent image forming device), the reference 41 represents a unit case, the reference 42 represents a polygon mirror, the reference 51 represents a primary transfer device, the reference 52 represents a secondary transfer device, the reference 53 represents a belt cleaning device, the reference 61 represents a delivery roll, the reference 62 represents a transport roll, the reference 63 represents an alignment roll, the reference 66 represents a fixing device, the reference 67 represents a discharge roll, the reference 68 represents a paper discharge portion, the reference 71 represents a manual feeding device, the reference 72 represents a delivery roll, the reference 73 represents a double-sided recording unit, the reference 74 represents a guide roll, the reference 76 represents a transport path, the reference 77 represents a transport roll, the reference 230 represents an intermediate transfer belt, the references 231 and 232 represent a support roll, the reference 521 represents a secondary transfer roll, and the reference 531 represents a cleaning blade.

In the tandem type image forming apparatus shown in FIG. 2, image forming units 22 (specifically, 22*a* to 22*d*) of four colors (yellow, magenta, cyan, and black in the present exemplary embodiment) are arranged in a body housing 21. A belt module 23 including an intermediate transfer belt 230 that is circulated and transported along an arrangement direction of the image forming units 22 is disposed above the image forming units. A recording medium supply cassette 24 accommodating a recording medium (not shown) such as paper is disposed in a lower part of the body housing 21, and a recording medium transport path 25 serving as a transport path for the recording medium from the recording medium supply cassette 24 is disposed in a vertical direction.

In the present exemplary embodiment, the image forming units 22 (22*a* to 22*d*) form, for example, a toner image for yellow, a toner image for magenta, a toner image for cyan, and a toner image for black (the arrangement is not necessarily limited to this order), respectively, in order from the upstream side in the circulation direction of the intermediate transfer belt 230. In addition, each image forming unit includes a photoreceptor unit 30, a developing unit 33, and one common exposure unit 40.

Here, the photoreceptor unit 30 is, for example, a unit in which a photoreceptor drum 31, a charging roll 32 (an example of the charging device) that previously charges the photoreceptor drum 31, and a cleaning device 34 that removes a residual toner on the photoreceptor drum 31 are integrated into a sub-cartridge.

In addition, the developing unit 33 develops an electrostatic latent image formed by exposure of the exposure unit 40 on the charged photoreceptor drum 31 with a corresponding color toner (for example, negative), and for example, configures a process cartridge (so-called Customer Replaceable Unit) by being integrated with a sub-cartridge consisting of the photoreceptor unit 30.

Needlessly to say, the photoreceptor unit 30 may be separated from the developing unit 33 and used as a single process cartridge. In addition, in FIG. 2, the reference 35 (35*a* to 35*d*) represents a toner cartridge for replenishing each color component toner to each developing unit 33 (the toner replenishing path is not shown).

On the other hand, the exposure unit 40 includes, for example, four semiconductor lasers (not shown), one polygon mirror 42, an imaging lens (not shown), and mirrors (not shown) corresponding to the respective photoreceptor units 30 in a unit case 41. The above components are arranged so that the light from the semiconductor laser for each color component is deflected and scanned by the polygon mirror 42, and the light image is guided to the corresponding exposure point on the photoreceptor drum 31 via the imaging lens and the mirror.

In addition, in the present exemplary embodiment, in the belt module 23, for example, the intermediate transfer belt 230 is extended between a pair of support rolls (one roll is a drive roll) 231 and 232, and primary transfer devices (primary transfer rolls in this example) 51 are disposed on a back surface of the intermediate transfer belt 230 corresponding to the photoreceptor drums 31 of the photoreceptor units 30 to apply a voltage having a polarity opposite to the charging polarity of the toner to the primary transfer device 51, thereby electrostatically transferring the toner image on the photoreceptor drum 31 to the intermediate transfer belt 230. Furthermore, a secondary transfer device 52 is disposed at a portion corresponding to the support roll 232 on the downstream side of the downstream-most image forming unit 22*d* of the intermediate transfer belt 230 to secondarily transfer (batch transfer) the primarily transferred image on the intermediate transfer belt 230 to a recording medium.

In the present exemplary embodiment, the secondary transfer device 52 includes a secondary transfer roll 521 disposed in pressure contact with the toner image holding surface side of the intermediate transfer belt 230, and a back roll (also serving as the support roll 232 in this example) that is disposed on the back surface side of the intermediate transfer belt 230 and forms the counter electrode of the secondary transfer roll 521. For example, the secondary transfer roll 521 is grounded, and a bias having the same polarity as the charging polarity of the toner is applied to the back roll (support roll 232).

Furthermore, a belt cleaning device 53 is disposed on the upstream side of the upstream-most image forming unit 22*a* of the intermediate transfer belt 230, and removes a residual toner on the intermediate transfer belt 230.

In addition, the recording medium supply cassette 24 is provided with a delivery roll 61 that delivers a recording medium, and transport rolls 62 that deliver a recording medium are disposed immediately after the delivery roll 61. On the recording medium transport path 25 positioned immediately before the secondary transfer portion, alignment rolls 63 that supply a recording medium to the secondary transfer portion at a predetermined timing are disposed. On the other hand, a fixing device 66 is provided on the recording medium transport path 25 positioned on the downstream side of the secondary transfer portion, and discharge rolls 67 for discharging a recording medium are provided on the downstream side of the fixing device 66. The discharged recording medium is accommodated in a paper discharge portion 68 formed in an upper part of the body housing 21.

Furthermore, in the present exemplary embodiment, a manual feeding device (MSI) 71 is provided at the side of the body housing 21, and the recording medium on the manual feeding device 71 is delivered toward the recording medium transport path 25 by the transport rolls 62 and delivery rolls 72.

Furthermore, a double-sided recording unit 73 is attached to the body housing 21, and when a double-sided mode in which image recording is performed on both sides of a recording medium is selected, the double-sided recording unit 73 reverses the recording medium on which one-sided recording has been completed by the discharge rolls 67, and takes the recording medium into the inside by the guide roll 74 in front of the entrance to transport the recording medium along an internal recording medium return transport path 76 by transport rolls 77 and supply the recording medium to the alignment rolls 63 again.

Next, the cleaning device 34 disposed in the tandem type image forming apparatus shown in FIG. 2 will be described in detail.

Figure 3:
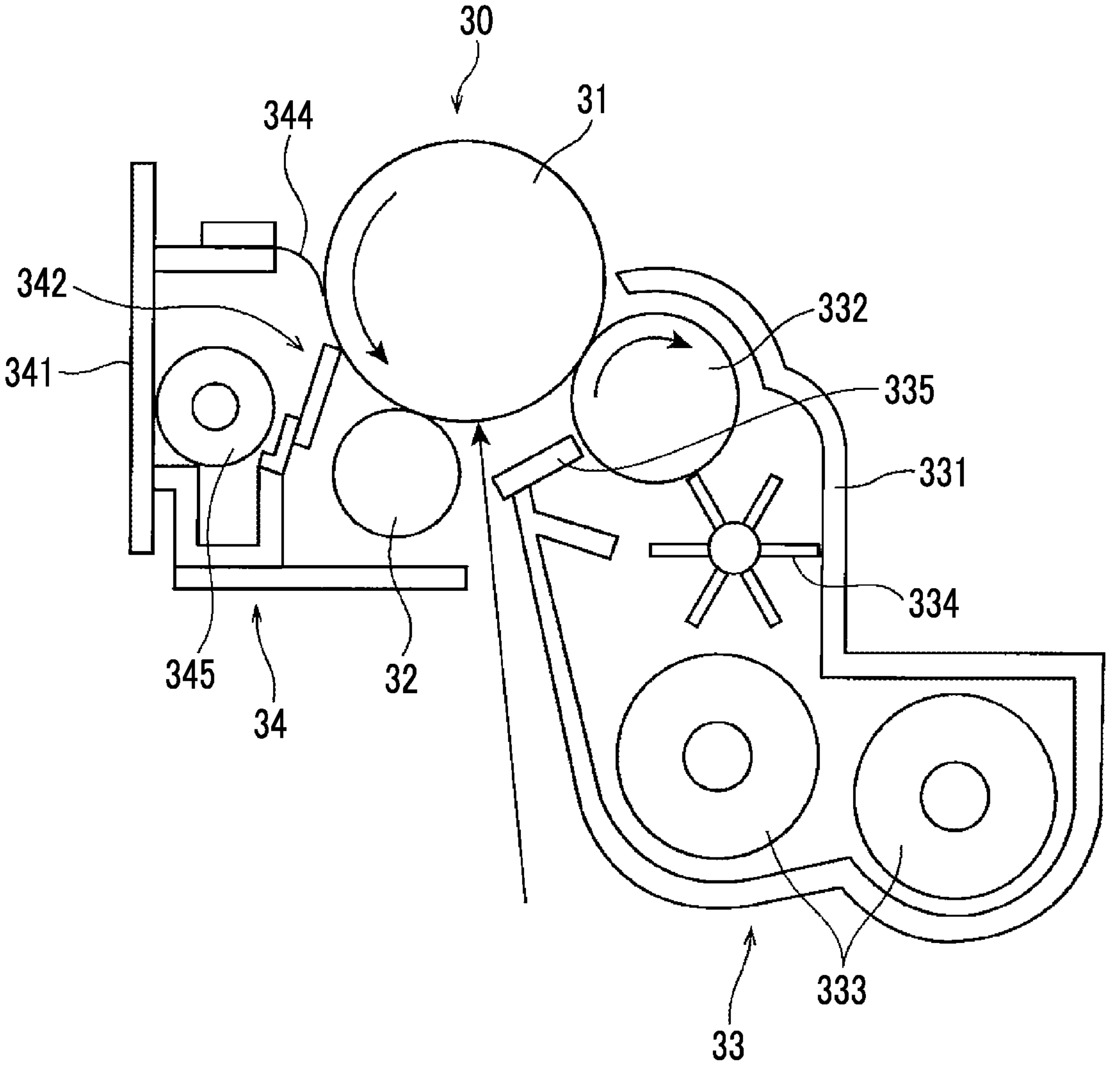
FIG. 3 is a schematic cross-sectional view showing an example of a cleaning device according to the present exemplary embodiment.

FIG. 3 is a schematic cross-sectional view showing an example of the cleaning device according to the present exemplary embodiment, and also shows the photoreceptor drum 31, the charging roll 32, and the developing unit 33 that configure a sub-cartridge together with the cleaning device 34 shown in FIG. 2.

In FIG. 3, the reference 32 represents a charging roll (charging device), the reference 331 represents a unit case, the reference 332 represents a developing roll, the reference 333 represents a toner transport member, the reference 334 represents a transport paddle, the reference 335 represents a trimming member, the reference 341 represents a cleaning case, the reference 342 represents a cleaning blade, the reference 344 represents a film seal, and the reference 345 represents a transport member.

The cleaning device 34 has a cleaning case 341 in which a residual toner is accommodated and an opening is provided to face the photoreceptor drum 31. A cleaning blade 342 disposed in contact with the photoreceptor drum 31 is attached to a lower edge of the opening of the cleaning case 341 via a bracket not shown, and a film seal 344 is attached to an upper edge of the opening of the cleaning case 341 to keep airtightness between the cleaning case and the photoreceptor drum 31. The reference 345 represents a transport member that guides the waste toner accommodated in the cleaning case 341 to a waste toner container at the side.

In the present exemplary embodiment, in all the cleaning devices 34 of the image forming units 22 (22*a* to 22*d*), the cleaning blade according to the present exemplary embodiment is used as the cleaning blade 342, and may also be used as a cleaning blade 531 used in the belt cleaning device 53.

In addition, as shown in FIG. 3, for example, the developing unit (developing device) 33 used in the present exemplary embodiment has a unit case 331 in which a developer is accommodated and an opening is provided to face the photoreceptor drum 31. Here, a developing roll 332 is disposed at a position facing the opening of the unit case 331, and a toner transport member 333 for agitating and transporting a developer is disposed in the unit case 331. Furthermore, a transport paddle 334 may be disposed between the developing roll 332 and the toner transport member 333.

In the development, a developer is supplied to the developing roll 332, and then transported to a developing region facing the photoreceptor drum 31 in a state where, for example, a trimming member 335 regulates the thickness of the developer layer.

In the present exemplary embodiment, as the developing unit 33, for example, a two-component developer consisting of a toner and a carrier may be used, or a one-component developer consisting only of a toner may be used.

As the toner used in the present exemplary embodiment, for example, a toner in which an external additive is externally added to toner particles is preferably used. The external additive may or may not contain a lubricant. In the present exemplary embodiment, since the surface of the image holder is cleaned by using the above-described cleaning blade, cleaning defects are less likely to occur even in a case where the external additive contains no lubricant.

The volume-average particle size (D50v) of the toner particles is, for example, preferably 2 μm or more and 10 μm or less, and more preferably 4 μm or more and 8 μm or less.

The various average particle sizes of the toner particles are measured using COULTER MULTISIZER II (manufactured by Beckman Coulter Inc.) and using ISOTON-II (manufactured by Beckman Coulter Inc.) as an electrolytic solution.

In the measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to 100 ml or more and 150 ml or less of an electrolytic solution.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

A cumulative volume distribution is drawn from the small diameter side with respect to the particle size ranges (channels) divided based on the particle size distribution measured, and the particle size at an accumulation of 50% is defined as a volume-average particle size D50v.

Next, operations of the image forming apparatus according to the present exemplary embodiment will be described. First, in a case where each image forming unit 22 (22*a* to 22*d*) forms a monochromatic toner image corresponding to each color, the monochromatic toner images of the respective colors are sequentially overlapped and primarily transferred to the surface of the intermediate transfer belt 230 so as to match the original information. Subsequently, the color toner image transferred to the surface of the intermediate transfer belt 230 is transferred to a surface of a recording medium by the secondary transfer device 52, and the recording medium to which the color toner image is transferred undergoes a fixing process by the fixing device 66 and is discharged to the paper discharge portion 68.

On the other hand, in each image forming unit 22 (22*a* to 22*d*), the residual toner on the photoreceptor drum 31 is cleaned by the cleaning device 34, and the residual toner on the intermediate transfer belt 230 is cleaned by the belt cleaning device 53.

In such a course of image formation, each residual toner is cleaned by the cleaning device 34 (or the belt cleaning device 53).

The cleaning blade 342 may be fixed via a spring material instead of being directly fixed to the frame member in the cleaning device 34 as shown in FIG. 3.

EXAMPLES

Hereinafter, the present exemplary embodiment will be described in more detail by illustrating examples. However, the present exemplary embodiment is not limited to the following examples. Unless otherwise specified, synthesis, treatment, production, and the like are performed at room temperature (25° C. 3° C.). In the following description, "parts" and "%" are on a mass basis unless otherwise specified.

Preparation of Cleaning Blade

Cleaning Blade (1)

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (manufactured by Soken Chemical & Engineering Co., Ltd., ACTFLOW UMB-2005B) is used as a soft segment material. The hard segment material and the soft segment material are mixed together at a ratio of 6:4 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 70° C. for 3 hours in a nitrogen atmosphere. Subsequently, the isocyanate compound is further added thereto, and the obtained mixture is reacted at 70° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes so that air bubbles are not created, thereby preparing a composition for forming a cleaning blade. The composition for forming a cleaning blade is poured into an adjusted centrifugal molding machine and subjected to a curing reaction.

Subsequently, the cleaning blade is immersed in a 4,4'-diphenylmethane diisocyanate (manufactured by Nippon Polyurethane Industry Co., Ltd., MILLIONATE MT) bath at 80° C. for 5 minutes, and then taken out of the bath. The cleaning blade is aged and heated, and then dried at room temperature (25° C.) and cut to have a length of 15 mm, a thickness of 2 mm, and a tip angle of a contact portion of 70 degrees.

By the above operation, a cleaning blade (1) is obtained.

The results of the measurement of the Young's modulus of the contact portion in the obtained cleaning blade and the area ratio ("Area Ratio" in the table) of aggregates in the contact portion by the above-described method are shown in Table 1.

Cleaning Blades (2) to (10), (C2) to (C4), and (C6) to (C8)

Cleaning blades (2) to (10), (C2) to (C4), and (C6) to (C8) are obtained in the same manner as the manner adopted for preparing the cleaning blade (1), respectively, except that the ratio between the hard segment material of a polyol component and the soft segment material and the kind of the isocyanate compound are changed so that the Young's modulus of the contact portion and the area ratio of aggregates in the contact portion are as shown in Table 1, and the cutting is performed so that the tip angle of the contact portion is as shown in Table 1. The results of the measurement of the Young's modulus of the contact portion in the obtained cleaning blade and the area ratio ("Area Ratio" in the table) of aggregates in the contact portion by the above-described method are shown in Table 1.

Cleaning Blade (11)

A cleaning blade (11) is obtained in the same manner as the manner adopted for preparing the cleaning blade (1), except that the ratio between the hard segment material of a polyol component and the soft segment material and the kind of the isocyanate compound are changed, and the step of immersing the cleaning blade in a 4,4'-diphenylmethane diisocyanate (manufactured by Nippon Polyurethane Industry Co., Ltd., MILLIONATE MT) bath at 80° C. for 5 minutes is not performed so that the Young's modulus of the contact portion and the area ratio of aggregates in the contact portion are as shown in Table 1, and the cutting is performed so that the tip angle of the contact portion is as shown in Table 1.

The results of the measurement of the Young's modulus of the contact portion in the obtained cleaning blade and the area ratio ("Area Ratio" in the table) of aggregates in the contact portion by the above-described method are shown in Table 1.

Cleaning Blades (C1) and (C5)

Cleaning blades (C1) and (C5) are obtained in the same manner as the manner adopted for preparing the cleaning blade (1), respectively, except that the step of immersing the cleaning blade in a 4,4'-diphenylmethane diisocyanate (manufactured by Nippon Polyurethane Industry Co., Ltd., MILLIONATE MT) bath at 80° C. for 5 minutes is not performed, and the cutting is performed so that the tip angle of the contact portion is as shown in Table 1.

The results of the measurement of the Young's modulus of the contact portion in the obtained cleaning blade and the area ratio ("Area Ratio" in the table) of aggregates in the contact portion by the above-described method are shown in Table 1.

Evaluation of Cleanliness (Color Streaks)

As a cleaning blade for an image holder, the cleaning blade shown in Table 1 is mounted on an image forming apparatus "ApeosPort-VI C7771 manufactured by FUJIFILM Business Innovation Japan Corp.". As an image holder, an electrophotographic photoreceptor having a conductive substrate and a laminated photosensitive layer, in which a coefficient of needle friction of a surface is 0.7 or more, is used. The coefficient of relative friction that is a coefficient of dynamic friction between the surface of the used electrophotographic photoreceptor and the contact portion of the mounted cleaning blade is shown in Table 1. As a charging device, a charging roll that charges the surface of the image holder by applying an AC voltage is used so that an effective value ("Voltage" in the table) of the applied AC voltage is as shown in Table 1.

10,000 sheets of images having a density of 40% are formed using A4 paper in an environment at a temperature of 28° C. and a humidity of 80% RH, and the 10,000-th image is evaluate based on the following standard. The results are shown in Table 1 ("Color Streaks" in the table).

G1: Color streaks occurring by cleaning defects are not confirmed.

G2: Color streaks are not visually confirmed, and slight color streaks are confirmed by a microscope or the like.

G3: Slight color streaks are visually confirmed.

G4: Clear color streaks are visually confirmed.

Evaluation of Wear and Chipping

As a cleaning blade for an image holder, the cleaning blade shown in Table 1 is mounted on an image forming apparatus "ApeosPort-VI C7771 manufactured by FUJIFILM Business Innovation Japan Corp.". As an image holder, an electrophotographic photoreceptor having a conductive substrate and a laminated photosensitive layer, and having protrusions having a height of 5 μm and a width of 20 μm in an axial direction of the image holder on a surface thereof is used. As a charging device, a charging roll that charges the surface of the image holder by applying an AC voltage is used so that an effective value of the applied AC voltage is as shown in Table 1.

100 sheets of images having a density of 40% are formed using A4 paper in an environment at a temperature of 10° C. and a humidity of 20% RH, and then the depths of wear and chipping in the contact portion of the cleaning blade are measured by a laser microscope (VK-X200) manufactured by Keyence Corporation and evaluated based on the following standard. The results are shown in Table 1 ("Chipping" in the table).

G1: No wear is confirmed, or wear with a depth of less than 1 μm is confirmed.

G2: No chipping is confirmed, and wear with a depth of 1 μm or more and less than 5 μm is confirmed.

G3: Chipping with a depth of 5 μm or more and less than 10 μm is confirmed.

G4: Chipping with a depth of 10 μm or more is confirmed.

As shown in Table 1, it is found that in the examples, the occurrence of color streaks by cleaning defects is suppressed as compared to the comparative examples.

The present disclosure includes the following aspects.

(((1)))

A cleaning blade, wherein a Young's modulus of a contact portion that comes into contact with a member to be cleaned is 14 MPa or more and 25 MPa or less, and a tip angle of the contact portion is 55 degrees or more and 80 degrees or less.

(((2)))

The cleaning blade according to (((1))), wherein the tip angle is 65 degrees or more and 75 degrees or less.

(((3)))

The cleaning blade according to (((1))) or (((2))), wherein the Young's modulus is 18 MPa or more and 24 MPa or less.

(((4)))

The cleaning blade according to any one of (((1))) to (((3))), wherein the contact portion is configured with a polyurethane rubber member.

(((5)))

The cleaning blade according to (((4))), wherein the polyurethane rubber member has a hard segment and a soft segment, and in an image that is an AFM phase image obtained by observing a surface of the contact portion with an atomic force microscope, an area ratio of aggregates of the hard segment is 18% or more and 28% or less with respect to the whole image.

TABLE 1

| | Cleaning Blade | | | | | | Evaluation | |
|---|---|---|---|---|---|---|---|---|
| | No. | Young's Modulus (MPa) | Tip Angle (degree) | Area Ratio (%) | Coefficient of Relative Friction | Voltage (V) | Color Streaks | Chipping |
| Example 1 | 1 | 20 | 70 | 24 | 0.9 | 1800 | G1 | G1 |
| Example 2 | 2 | 14 | 55 | 18 | 0.9 | 1800 | G2 | G2 |
| Example 3 | 3 | 24 | 55 | 28 | 0.9 | 1800 | G2 | G2 |
| Example 4 | 4 | 14 | 80 | 18 | 0.9 | 1800 | G2 | G1 |
| Example 5 | 5 | 24 | 80 | 28 | 0.9 | 1800 | G2 | G1 |
| Example 6 | 6 | 18 | 65 | 22 | 0.9 | 1800 | G2 | G1 |
| Example 7 | 7 | 22 | 65 | 26 | 0.9 | 1800 | G2 | G1 |
| Example 8 | 8 | 18 | 75 | 22 | 0.9 | 1800 | G2 | G1 |
| Example 9 | 9 | 22 | 75 | 26 | 0.9 | 1800 | G2 | G1 |
| Example 10 | 10 | 20 | 70 | 24 | 0.9 | 1800 | G2 | G1 |
| Example 11 | 10 | 20 | 70 | 24 | 0.9 | 2000 | G2 | G2 |
| Example 12 | 11 | 20 | 70 | 24 | 0.9 | 1800 | G2 | G2 |
| Comparative Example 1 | C1 | 12 | 55 | 16 | 0.9 | 1800 | G3 | G4 |
| Comparative Example 2 | C2 | 26 | 55 | 30 | 0.9 | 1800 | G3 | G4 |
| Comparative Example 3 | C3 | 14 | 50 | 18 | 0.9 | 1800 | G3 | G3 |
| Comparative Example 4 | C4 | 24 | 50 | 28 | 0.9 | 1800 | G3 | G4 |
| Comparative Example 5 | C5 | 12 | 80 | 16 | 0.9 | 1800 | G4 | G2 |
| Comparative Example 6 | C6 | 26 | 80 | 30 | 0.9 | 1800 | G4 | G2 |
| Comparative Example 7 | C7 | 14 | 85 | 18 | 0.9 | 1800 | G4 | G2 |
| Comparative Example 8 | C8 | 24 | 85 | 28 | 0.9 | 1800 | G4 | G2 |

(((6)))

The cleaning blade according to (((4))) or (((5))), wherein the contact portion has an impregnated and cured layer of an isocyanate compound as a surface layer.

(((7)))

A cleaning blade, wherein a contact portion that comes into contact with a member to be cleaned is configured with a polyurethane rubber member having a hard segment and a soft segment, in an image that is an AFM phase image obtained by observing a surface of the contact portion with an atomic force microscope, an area ratio of aggregates of the hard segment is 18% or more and 28% or less with respect to the whole image, and a tip angle of the contact portion is 55 degrees or more and 80 degrees or less.

(((8)))

The cleaning blade according to (((7))), wherein the tip angle is 65 degrees or more and 75 degrees or less.

(((9)))

The cleaning blade according to (((7))) or (((8))), wherein the contact portion has an impregnated and cured layer of an isocyanate compound as a surface layer.

(((10)))

A cleaning device comprising: the cleaning blade according to any one of (((1))) to (((9))).

(((11)))

A process cartridge comprising:

an image holder; and the cleaning device according to (((10))) that cleans a surface of the image holder by bringing the cleaning blade into contact with the surface of the image holder, wherein the process cartridge is detachably attached to an image forming apparatus.

(((12)))

The process cartridge according to (((11))), further comprising:

a charging device that charges the surface of the image holder by applying an AC voltage.

(((13)))

The process cartridge according to (((11))) or (((12))), wherein a coefficient of dynamic friction of the surface of the image holder against a sapphire needle is 0.7 or more.

(((14)))

The process cartridge according to any one of (((11))) to (((13))), wherein a coefficient of dynamic friction between the surface of the image holder and the contact portion of the cleaning blade is 0.9 or more and 1.2 or less.

(((15)))

An image forming apparatus comprising:

an image holder;

a charging device that charges the image holder;

an electrostatic latent image forming device that forms an electrostatic latent image on a surface of the charged image holder;

a developing device that develops the electrostatic latent image formed on the surface of the image holder with a toner to form a toner image;

a transfer device that transfers the toner image formed on the image holder onto a recording medium; and the cleaning device according to (((10))) that brings the cleaning blade into contact with the surface of the image holder after transfer of the toner image by the transfer device to perform cleaning.

(((16)))

The image forming apparatus according to (((15))), wherein the charging device is a charging device that charges the surface of the image holder by applying an AC voltage.

(((17)))

The image forming apparatus according to (((15))) or (((16))), wherein a coefficient of dynamic friction of the surface of the image holder against a sapphire needle is 0.7 or more.

(((18)))

The image forming apparatus according to any one of (((15))) to (((17))), wherein a coefficient of dynamic friction between the surface of the image holder and the contact portion of the cleaning blade is 0.9 or more and 1.2 or less.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning blade, wherein a Young's modulus of a contact portion that comes into contact with a member to be cleaned is 14 MPa or more and 25 MPa or less, and a tip angle of the contact portion is 55 degrees or more and 80 degrees or less, wherein the contact portion is configured with a polyurethane rubber member, wherein the contact portion has an impregnated and cured layer of an isocyanate compound as a surface layer, wherein the polyurethane rubber member has a hard segment and a soft segment, and in an image that is an AFM phase image obtained by observing a surface of the contact portion with an atomic force microscope, an area ratio of aggregates of the hard segment is 18% or more and 28% or less with respect to the whole image.

2. The cleaning blade according to claim 1, wherein the tip angle is 65 degrees or more and 75 degrees or less.

3. The cleaning blade according to claim 2, wherein the Young's modulus is 18 MPa or more and 24 MPa or less.

4. A cleaning device comprising:

the cleaning blade according to claim 3.

5. A cleaning device comprising:

the cleaning blade according to claim 2.

6. A cleaning device comprising:

the cleaning blade according to claim 1.

7. A process cartridge comprising:

an image holder; and the cleaning device according to claim 6 that cleans a surface of the image holder by bringing the cleaning blade into contact with the surface of the image holder, wherein the process cartridge is detachably attached to an image forming apparatus.

8. The process cartridge according to claim 7, further comprising:

a charging device that charges the surface of the image holder by applying an AC voltage.

9. The process cartridge according to claim 7, wherein a coefficient of dynamic friction of the surface of the image holder against a sapphire needle is 0.7 or more.

10. The process cartridge according to claim 7, wherein a coefficient of dynamic friction between the surface of the image holder and the contact portion of the cleaning blade is 0.9 or more and 1.2 or less.

11. An image forming apparatus comprising:

an image holder;

a charging device that charges the image holder;

an electrostatic latent image forming device that forms an electrostatic latent image on a surface of the charged image holder;

a developing device that develops the electrostatic latent image formed on the surface of the image holder with a toner to form a toner image;

a transfer device that transfers the toner image formed on the image holder onto a recording medium; and the cleaning device according to claim 6 that brings the cleaning blade into contact with the surface of the image holder after transfer of the toner image by the transfer device to perform cleaning.

12. The image forming apparatus according to claim 11, wherein the charging device is a charging device that charges the surface of the image holder by applying an AC voltage.

13. The image forming apparatus according to claim 11, wherein a coefficient of dynamic friction of the surface of the image holder against a sapphire needle is 0.7 or more.

14. The image forming apparatus according to claim 11, wherein a coefficient of dynamic friction between the surface of the image holder and the contact portion of the cleaning blade is 0.9 or more and 1.2 or less.

* * * * *